United States Patent [19]

Holster et al.

[11] 3,747,628

[45] July 24, 1973

[54] FLUIDIC FUNCTION MODULE FOR USE IN A SYSTEM FOR CONSTRUCTING FLUIDIC CIRCUITS

[75] Inventors: Peter Leendert Holster; Hendricus Franciscus Gerardus Smulders, both of Emmasingel, Eindhoven, Netherlands

[73] Assignee: U.S. Philips Corporation, New York, N.Y.

[22] Filed: Feb. 1, 1972

[21] Appl. No.: 222,476

[30] Foreign Application Priority Data

Feb. 17, 1971 Netherlands ....................... 7102074

[52] U.S. Cl. ................................. 137/269, 137/833

[51] Int. Cl. ............................ F15c 3/04, F15c 5/00

[58] Field of Search .................... 137/81.5, 269, 833

[56] References Cited

UNITED STATES PATENTS

| | | | |
|---|---|---|---|
| 3,658,088 | 4/1972 | Jensen et al. | 137/81.5 X |
| 3,407,846 | 10/1968 | Brandenberg | 137/81.5 X |
| 3,461,900 | 8/1969 | Dexter et al. | 137/81.5 |
| 3,465,774 | 9/1969 | Kautz et al. | 137/81.5 |
| 3,547,139 | 12/1970 | Berkum | 137/81.5 |

*Primary Examiner*—William R. Cline
*Attorney*—Frank R. Trifari

[57] ABSTRACT

A fluidic function module for constructing fluidic logical and/or analog circuit and which comprises a basic part including a plurality of fluidic circuit elements and a function connecting part which is arranged in contact with the basic part and in which passages have been formed which appropriately interconnect the input, output, supply and zero-pressure passages of the individual circuit elements, thus making the function module suitable for use as, for example, an AND, an OR, a universal or a storage module or as a function module having another desired function.

The function connecting part is provided with a standard passage pattern. The user of the function module adapts the function connecting part to the intended use by removing, according to instructions given in tables, partitions from between different passages of the standard passage system and from between passages of the standard passage system and the ambient atmosphere at given grid locations and by subsequently assembling the function connecting part and the basic part to form a function module.

4 Claims, 11 Drawing Figures

Figure 5:
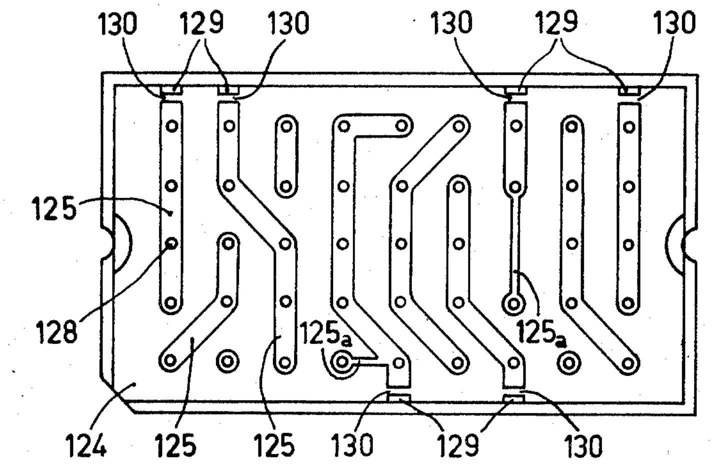

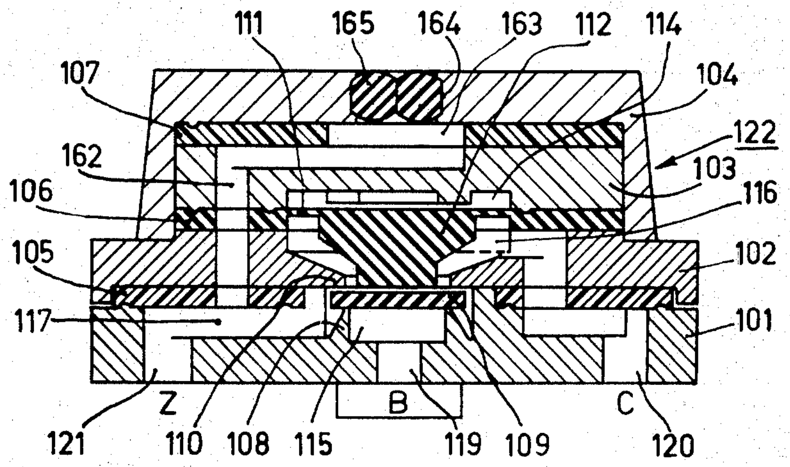
Fig.1
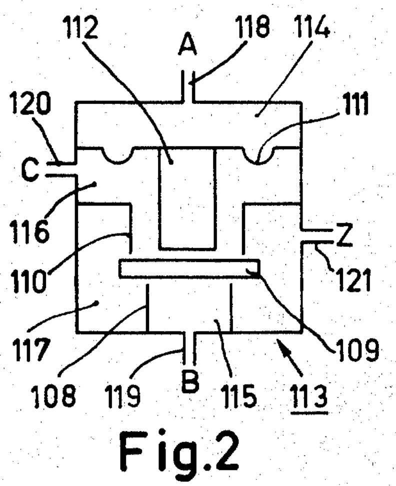
Fig.2
| A | B | C | Z |
|---|---|---|---|
| 0 | 0 | 0 | 0 |
| 0 | 0 | 1 | 1 |
| 0 | 1 | 0 | 1 |
| 0 | 1 | 1 | 1 |
| 1 | 0 | 0 | 0 |
| 1 | 0 | 1 | 1 |
| 1 | 1 | 0 | 0 |
| 1 | 1 | 1 | 1 |
Fig.3
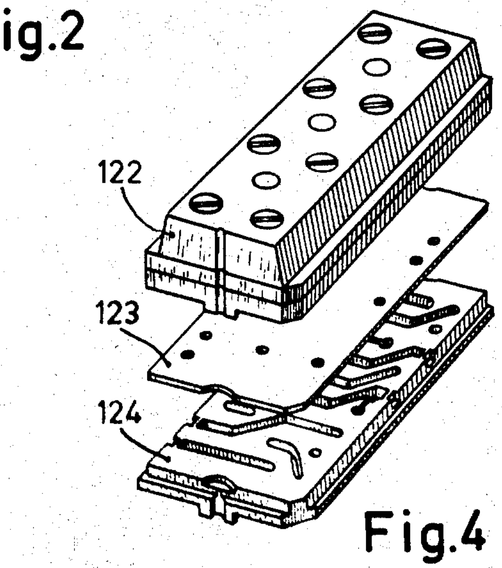
Fig.4

| I | II | III | IV | V |
|---|---|---|---|---|
| 1 | $z = a + b$ | a —, b — → [≥1] → z | 21 23 39 42 45 58 62 65 68 | 12 17 77 |
| 2 | $z = a + \bar{b}$ $(x = f[c])$ | a —, b —o → [≥1] → z | 21 23 35 42 54 62 | 12 77 |
| 3 | $z = d + \bar{b}$ $(x = f[a,c])$ | d —, b —o → [≥1] → z | 21 23 24 35 42 62 | 12 77 |
| 4 | $z = \bar{a} + \bar{b}$ $(x = f[c])$ | a —o, b —o → [≥1] → z | 22 23 31 42 45 54 62 | 77 |
| 5 | $z = \bar{d} + \bar{b}$ $(x = f[a\ c])$ | d —o, b —o → [≥1] → z | 22 23 24 31 42 45 62 | 77 |
| 6 | $z = \bar{a}.b - \bar{b}.a$ | a —, b — → [=1] → z | 22 23 31 37 45 48 52 59 62 65 68 | 77 |
| 7 | $z = a + b + c$ | b —, a —, c — → [≥1] → z | 21 23 29 32 42 45 58 62 65 68 | 17 77 |
| 8 | $z = a + b + \bar{c}$ | b —, a —, c —o → [≥1] → z | 21 23 26 39 42 58 62 65 68 | 12 17 77 |
| 9 | $z = a + \bar{b} + c$ | c —, a —, b —o → [≥1] → z | 21 23 29 35 42 58 62 65 68 | 12 17 77 |
| 10 | $z = a + \bar{b} + \bar{c}$ | b —o, a —, c —o → [≥1] → z | 21 23 27 35 42 48 59 62 65 68 | 12 77 |
| 11 | $z = \bar{a} + \bar{b} + c$ | a —o, c —, b —o → [≥1] → z | 21 23 29 37 42 48 55 62 65 68 | 12 77 |
| 12 | $z = \bar{a} + \bar{b} + \bar{c}$ | b —o, a —o, c —o → [≥1] → z | 22 23 25 37 42 45 48 51 62 67 68 | 19 |

FLUIDIC FUNCTION MODULE FOR USE IN A SYSTEM FOR CONSTRUCTING FLUIDIC CIRCUITS

The invention relates to a fluidic function module for constructing fluidic circuits which, depending on the intended use, comprise one or more fluidic function modules and are intended to perform logic, analog and/or combined operations. Each function module comprises at leat a basic part including a plurality of seperate fluidic circuit elements and a function connecting part in which passage have been formed suitably interconnect the various input, output, air supply and vent passages of the individual circuit elements. The assembly comprising the basic part and the connecting part forms a function module which may have, for example, an AND, an OR, a universal or a storage function.

Function modules of this type are known. The paper "Universelles Baukastensystem fur pneumatische Steuerungen" ("Universal building block system for pneumatic controls") by H. Töpfer, D. Schrepel und A. Schwarz, in "Messen, Steuern, Regeln" 7, No. 2, February 1964, pages 63 – 72 describes a modular system which has found acceptance in practice, in particular for production mechanization, and is known as the "DRELOBA"-system.

This system is based on three different fundamental components which each contain a plurality of discrete circuit elements comprising double-diaphragm elements and/or double-acting check valves.

As is stated in the said paper, the design of the DRELOBA modular system is based on the consideration that in principle there are two alternative courses. On the one hand it would be possible to manufacture only one type of circuit element having a suitable circuit function, for example a NOT-OR element, and to offer it to the user. Obviously, this has advantages from the point of view of manufacturing technology, and in addition the user is enabled to design any desired logical circuit himself. However, the amount of design work to be performed by the user may be very large, and also expert knowledge is required.

The other alternative is that, if the emphasis is to be on the small amount of trouble to be expended by a user in designing circuits, it would be of advantage to the user if for each logical function a separate function module were available. However, the manufacture of many different function modules would set problems of fabrication technology to the manufacturer. A further disadvantage, which would also apply to large-scale users, is that a large assortment of modules must be kept in stock, which may be costly.

It was decided to try to find a compromise between the said two extremes. Thus, although various function modules are manufactured and marketed, they are resticted to five different types, i.e., an AND, an OR and a storage module and furthermore two different universal modules. By means of these modules and the further components which form part of the system, such as rubber separating sheets and basic connecting boards, the user is capable of building widely different circuits and combining them to control units.

Practice has shown, however, that designing circuits based on the DRELOBA system still involves comparatively much effort and experience. This is mainly due to the fact that the basic connecting boards are required not only to suitably interconnect the AND, OR and storage modules but also, when universal function modules are used for effecting those functions for which no function modules are available, to interconnect the discrete circuit elements in the base parts of the universal function modules. The fact that these two types of interconnections must be established side by side in the basic connecting boards is confusing and renders design involved and complex. A further disadvantage is that both the manufacturer and the user must keep stocks of five types of function modules.

Each DRELOBA function module is manufactured by gluing to one of the aforementioned basic parts a connecting plate to which in turn is glued a grid plate. For each of the various function modules a separate connecting plate is used which contains a system of passages such that the individual circuit elements in the basic part are correctly interconnected to provide the required function.

It is an object of the present invention to provide a system which in broad outline corresponds to the afore-described DRELOBA system, but is appreciably less subject to the said disadvantages. According to the invention this is achieved in that a fluidic function module of the type described at the beginning of this specification is provided which is characterized in that the function connecting part is provided with a standard passage system, the function connecting part being adapted to the intended function of the function module by removing certain readily removable partitions of the function connecting part from between the passages of the standard passage system.

It will be clear that in this manner quite another method is applied than in the DRELOBA system, for now the manufacturer does not supply to the user any function module but instead he supplies only basic parts containing the separate circuit elements and function connecting parts, for example in the form of connecting plates, containing a standardized pattern of passages. Hereinafter such connecting plates will be referred to as "universal connecting plates".

This enables the user to construct function modules within the possibilities of the circuit components contained in the basic part. In practice this need hardly impose any burden on the user, since the amount of work to be done on the universal connecting plates is very small and may, or example, consist of making perforations and/or removing thin partitions at a few points. In addition the manufacturer may, for example by providing clear and systematic tables, completely inform the user where the interconnections between the separate passages of the standard passage system should be established to result in a function module having a given intended circuit function.

The advantages of a circuit system by the use of function modules according to the invention are: simplicity of manufacturing technology on the side of the manufacturer, a reduction of the assortment of components to be kept in stock both by the manufacturer and by user, and appreciable simplification of the design of circuits by the user. An additional advantage is that many basic parts may, if desired, be used over and over again in other function modules simply by replacing the cheap connecting parts.

The latter advantage is furnished even for each basic part in an embodiment of the invention which is characterized in that given passages of the standard passage system are vented to the ambient atmosphere through vents in the function connecting part which have been connected to the respective passages of the standard passage system by removing readily removable partitions from between the said passages and the ambient atmosphere. Thus venting may always take place via the universal connecting plate and hence, in contradistinction to what is the case when using a DRELOBA function module of a universal type, it will never be necessary to drill holes or to make passages by any other method in the basic part itself. Hence, each basic part remains unchanged and may be used over and over again.

Another embodiment of the invention promotes an advantageous form of the standard passage system in the function connecting part and is characterized in that each of the said vents is in direct communication with a passage of the standard passage system of the function connecting part into which opens a passage of the basic part. Thus, in this embodiment, for the purpose of venting there is established a communication between the ambient atmosphere and those passages which are provided in any case to provide direct connections to the orifices of the various passages in the basic part. Consequently, such a passage is capable of perforing a double function, so that the number of passages in the function connecting part need not be extended to include separate vent passages.

The use of such a function connecting part provides further advantages in an embodiment of the invention which is characterized in that the standard passage system in the function connecting part includes at least one passage having an internal cross-sectional area which is appreciably smaller than are those of the remaining passages of the standard passage system, each of the smaller-area passage serving as a fluid restriction to effect given functions of the function module by serving as fluid restrictions.

Figure 6:
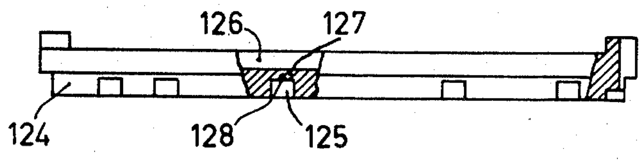
Figure 7:
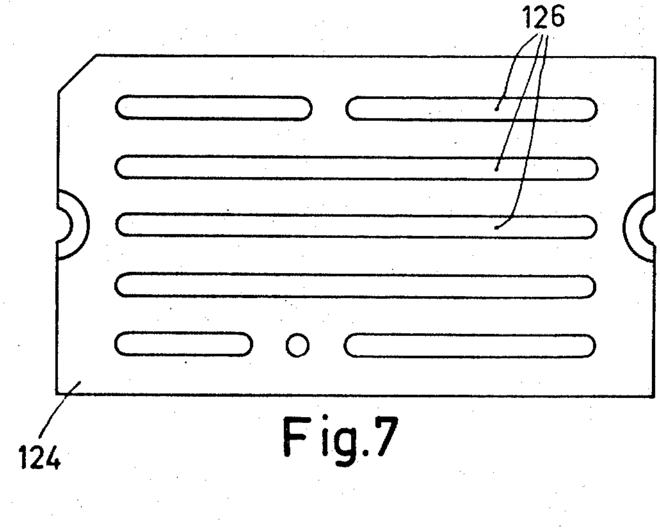
Figures 8, 9:
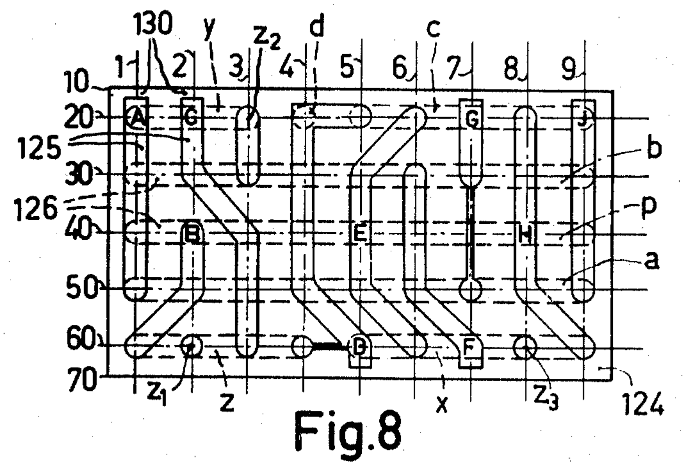
Figure 10:
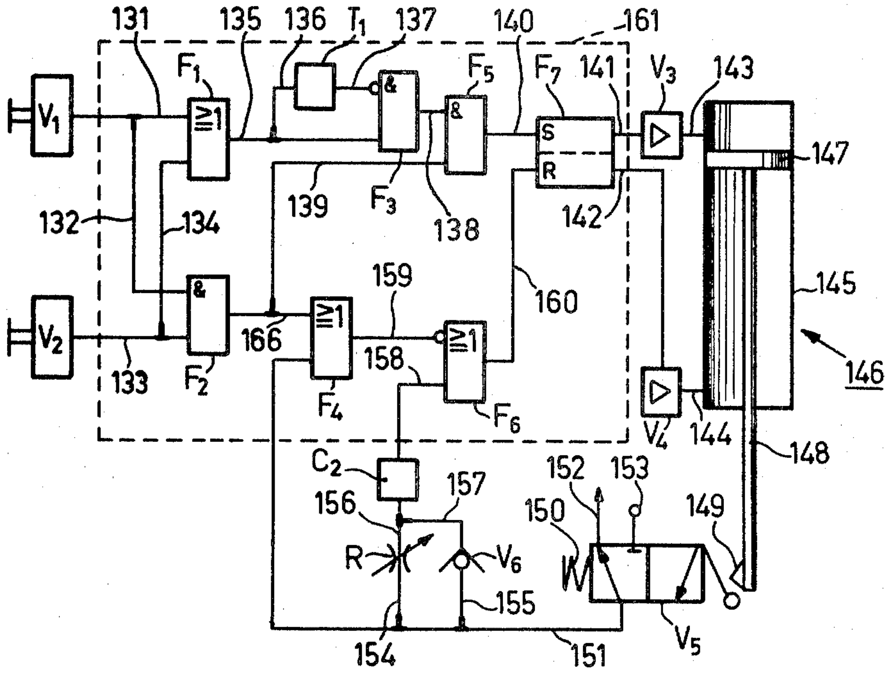
Figure 11:
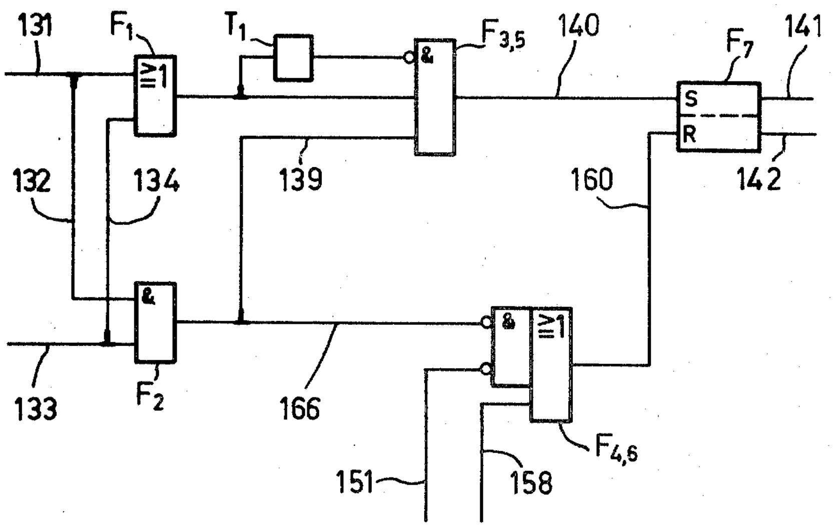

Embodiments of the invention will be described, by way of example, with reference to the accompanying diagrammatic drawings, in which:

FIG. 1 is a cross-sectional view of a basic part of a fluidic function module taken at the area of a fluidic logic circuit element included in the basic part, FIG. 2 is a diagram of the circuit element shown in cross-section in FIG. 1, FIG. 3 is the truth table associated with the circuit element shown in cross-section in FIG. 1 and diagrammatically in FIG. 2. The truth table shows the relationships between the three binary input signals A, B and C and the binary output signal Z, FIG. 4 is a perspective exploded view of the arts which together form a fluidic function module, i.e., a basic part and a function connecting part with an interposed gasket made of a resilient material, FIG. 5 is an elevation of that surface of a plate-shaped connecting part which faces a basic part and is provided with a first portion of a standard passage system, FIG. 6 is a side elevation, partly in section, of the connecting part of FIG. 5, FIG. 7 is an elevation of that surface of the connecting part shown in FIG. 5 which faces away from a basic part and is provided with the second portion of the standard passage system, FIG. 8 is a schematic elevation of the connecting part shown in FIG. 5 in which the passages situated in the other surface are shown in broken lines, while a grid of numbered vertical and horizontal lines is drawn over the connecting part, FIG. 9 is a drilling table for achieving "OR" functions, in which column I shows the serial numbers assigned to the function listed, column II shown the circuit equations, column III shown the associated IEC symbols, column IV gives the numbers of the locations of the grid of FIG. 8 at which holes are to be drilled in the plate-shaped connecting part shown in FIGS. 5 to 7 to provide the correct interconnections between the portions of the standard passage system shown in FIGS. 5 and 7, and column V gives the numbers of those locations in the grid of FIG. 8 at which vents are to be made by removing local partitions, FIG. 10 shows schematically a pneumatic press provided with a piston engine controlled by means of a fluidic logical circuit which permits universal and safe two-hand operation of the press, and FIG. 11 shows in simplified form the logical circuit which in FIG. 10 is enclosed by a broken-line box, for constructing the logical circuit by means of logical function modules according to the invention.

In all the Figures of the drawings corresponding parts are designated by like reference numerals.

Referring now to FIG. 1, a basic part 122 comprises three plates 101, 102 and 103 and a hood 104 which may be made, for example, of a suitable synthetic material by injection moulding. Clamped between them are three diaphragms 105, 106 and 107 which provide airtight seals. The plate 101 is provided with an annular valve seat 108 which cooperates with a disc-shaped valve 109 made of a resilient material. In its lower position shown in the drawing the valve 9 cooperates with the annular valve seat 108, but in its upper position it is capable of cooperating with a valve seat 110 in the plate 102. The diaphragm 106 through an annular part 111 of smaller thickness is integral with a movable part 112 which has a specially shaped cross-section. Hereinafter the part 112 will be referred to as the movable part of the circuit element.

To illustrate the operation of the circuit elements incorporated in a basic part of the type shown in FIG. 1, FIG. 2 shows schematically a single discrete circuit element.

The circuit element 113 shown schematically in FIG. 2 is a NOT element. The element comprises four chambers 114, 115, 116 and 117. The chamber 114 are separated from the other chambers by the diaphragm 11. The chambers 114 – 117 are provided with connecting passages 118, 119, 120 and 121 respectively through which pressure signals A, B, C and Z respectively may operate in these chambers. The valve 109 may be moved by means of the movable part 112 secured to the diaphragm 111. The valve 109 acts as a three-way valve. The chamber 117 is connected to the output Z of the circuit element and also, depending upon the position of the valve 109, either to the chamber 115 or to the chamber 116. The valve moves between the annular valve seats 108 and 110 and covers a surface area of a size about one half of that of the effective surface area of the diaphragm 11. This results in a fundamentally symmetrical switching characteristic, which means that the element switches when the pressure in the chamber 114 differs from one half of the pressure in the chamber 115. The term "switching characteristic" is used herein to mean the analogous relationship between the input pressure and the output pressure (provided with hysteresis).

FIG. 1 further shows a passage 162 which at one end communicates with the chamber 117 and at the other end with a measuring chamber 163. AT the top of this chamber an annular rubber valve 165 is arranged in a recess 164 formed in the hood 104. Through this valve a thin measuring probe may be inserted into the measuring chamber 163 to check the operation of the circuit element.

The operation of the circuit element shown in FIG. 2 may be analyzed by means of the truth table of FIG. 3. The binary values 0 and 1 are defined as follows: the presence of pressure is indicated by the logic symbol 1, the absence of pressure by the logic symbol 0. The NOT element or inverter of FIG. 2 has three input passages 118, 119 and 120 for the binary input signals A, B and C and a single output passage 121 for the output signal Z. The three input signals provide $2^3 = 8$ different combinations. The truth table of FIG. 3 shows that when all the input signals A, B and C are equal to 0 the output signal Z also is 0, and when the input signals A and B are 0 but the input signal C is 1 the output signal Z is 1, and so on. From the truth table of FIG. 3 there follows the switching formula for the NOT element shown in FIG. 2: $Z = A \cdot B + C$.

FIG. 4 shows a basic part 122, a gasket 123 and a connecting part in the form of a universal connecting plate 124. The basic part 122 comprises three NOT elements according to the diagram of FIG. 2 and when assembled with the gasket 123 and the universal connecting plate 124 forms a fluidic module for constructing fluidic circuits which, depending upon the intended use, comprise one or more fluidic modules for performing logical analog and/or combined operations, the function module comprising at least firstly a basic part 122 accommodating a plurality of individual fluidic circuit elements and secondly a function connecting part in the form of the universal connecting plate 124 in which passages have been formed which interconnect the various input, output, air supply and vent passages of the individual circuit elements of the basic part 122 in the appropriate manner, so that the assembly of basic part and connecting part forms a function module which may have, for example, an AND, an OR, a universal or a storage function.

FIG. 5 shows that surface of the universal function connecting plate 124 which when assembled with a basic part 122 faces this basic part.

FIG. 7 shows the opposite surface of the function connecting plate. The connecting plate 124 is made of a synthetic material, for example by injection moulding, so that the product shown in FIG. 5 to 7 may simply be manufactured by mass production methods. The universal function connecting plate 124 is provided both in its surface shown in FIG. 5 and in the opposite surface shown in FIG. 7 with standard passages which together form a standard passage system. The passages of the standard passage system formed in the surface of the universal connecting plate shown in FIG. 5 are designated by the reference numeral 125 and those formed in the other surface shown in FIG. 7 are designated by the reference numeral 126. Adapting the universal function connecting plate 124 to an intended function of a function module is achieved by removing readily removable partitions of the function connecting plate 124 from between passages 125 and passages 126 of the standard passage system, see for example in FIG. 6 the readily perforated partition 127 between a passage 125 and a passage 126. As FIGS. 5 and 7 clearly show, the passages 125 extend mainly at right angles to the passages 126 formed in the other surface of the function connecting plate. In the passage 125 centering indentations 128 have been formed at the grid crossings which serve to center a drill used for perforating a partition 127 between two passages 125 and 126 at the correct location.

Venting of given passages of the standard passage system formed in the universal connecting plate 124 to the ambient atmosphere may take place through vents 129 in the function connecting plate. The vents 129 may be brought into communication with the passages 125 by removing readily removable partitions 130 of the function connecting plate. These partitions in the assembled condition of the plate with a basic part form a partition between the respective passages 125 and the ambient atmosphere. Since all the vents 129 are provided in that surface of the universal connecting plate which is shown in FIG. 5, they will, when the partition 130 has been removed, be in direct communication with a passage 125 of the standard passage system into which a passage of the baic port opens.

The standard passage system in the function connecting plate 124 includes two passages 125*a* which have appreciably smaller cross-sectional areas than have the remaining passages 125. The passages 125*a* serve to effect given functions of the function module by serving as fluid restrictions. To the surface of the universal connecting plate shown in FIG. 7 there may be mounted in various manners grid plates which may be made to cooperate at will with other components of a complete circuit arrangement for interconnecting individual function modules. For example, in principle a function module according to the invention as shown in FIG. 4 may be made to cooperate with base connecting plates of the type described in the paper mentioned in the first paragraph of this specification. Another possibility is the use of a grid plate provided with miniature hose pylons, so that the various function modules of a circuit unit may be interconnected by flexible hoses.

The passages 125 of the standard passage system in the universal connecting plate 124 serve to connect to the passages for the signals of the basic part. These signals comprise the signals Z1, A, B and C for the first circuit element, Z2, D, E and F for the second circuit element, and Z3, G, H and J for the third circuit element of the basic part. The passages 126 form a supply passage, an output passage for the signal Z1, an output passage for the signal Z2, an output passage for the signal Z3 and four input signal passages.

To illustrate the manner in which function modules having different circuit functions may be constructed by means of a connecting plate 124, FIG. 8 again shows a function connecting plate 124. The passages 125 are drawn in solid lines, and the subjacent passages 126 are drawn in broken lines. Over the function connecting plate 124 there has been drawn in FIG. 8 a grid comprising vertical lines numbered from 1 to 9 and horizontal lines numbered 10, 20, 30 ... 70. At the respective locations of the grid the connecting passages for signals from the circuit elements in the basic part have been indicated. The passages 126 are designated by letters: the *p* passage is the supply passage, the *z* passage is the output passage for the signal Z1, the *y* passage is the output passage for the signal Z2, the *x* passage is the output passage for the signal Z3, and the *a*, *b*, *c* and *d* passages are the passages for the input signals.

As may be seen from FIG. 8, at the location 21 the signal A from the first circuit element of the basic part is applied to a passage 125 of the standard passage system in a function connecting plate 124. Similarly the signal C is applied to such a passage at the location 22, the signal Z3 at the location 68, and so on.

To adapt a function connecting plate 124 to a given intended function of a function module, connections must be established between passages 125 in one surface and passage 126 in the other surface of the function connecting plate at a number of locations of the grid shown in FIG. 8, and this may be effected by drilling holes at these grid locations. The task of a designer who wants to implement a fluidic circuit by means of function modules according to the invention may be appreciable facilitated by the provision of drilling tables which accurately indicate at which grid locations interconnections between standard passages 125 and 126 are to be established and partitions 130 are to be removed to achieved a given function.

FIG. 9 shows such a table for the realization of OR functions. The table comprises five columns numbered with Roman numerals. Column I gives the number of the OR function, column II contains the equations of the associated binaryy circuit functions, column III shows the associated IEC symbols, column IV contains the numbers of the grid locations at which the connecting plate 124 is to be perforated, and column V shows the grid location numbers of the partitions 130 of the connecting plate 124 to be removed. Column II shows on the lines of functions Nos. 3 and 5, enclosed in brackets, how the function of the preceding number may be realized with a restricted use of connections, which results in a more extensive residual function of the function module. The term "residual function" is used herein to denote a logic function which may be implemented with the circuit element in a basic part which has not been used for another function. Furthermore, function No. 9 indicates another connecting possibility than does function No. 8, and likewise function No. 11 indicates another connecting possibility then does function No. 10. With respect to function No. 12 it should be noted that the passage *c* in the connecting plate 124 may be extended to include the input passage *d* by drilling at grid location 24.

Other tables similar to that shown in FIG. 9 may be made available to the designer and hence implementation of a given function only requires the designer to look it up in the table. This provides him with all the information he needs about the connections to be established in the connecting plate 124 between the various passages of the standard passage system and about the partitions to be removed for venting.

To show how simply a designer may solve a given problem, an example of a circuit to realize a universal safe two-hand operating system for a pneumatic press will now be described.

A universal safe two-hand operating system must satisfy the following main requirements:

1. a signal may only produced when two pushbuttons are simultaneously depressed,
2. when the machine tool is safe take-over must be possible, so that from this instant both hands are free,
3. after a given adjustable time a reset must occur, the circuit returning to its initial condition,
4. protection against faults in the take-over circuit must be provided.

FIG. 10 is a circuit diagram of a fluidic logic circuit which satisfies the above requirements. In the diagram the various logic function units are indicated by IEC symbols. V1 and V2 are two air valves which are arranged to be operated by means of pushbuttons and each of which at its output deliver an air pressure signal when the associated pushbutton is depressed. The valve V1 is connected by a passage 131 to a function element F1 which has an OR function and by means of a passage 132 to a function element F2 which has and AND function. The valve V2 is connected to the function elements F2 by a passage 133 and to the function element F1 by the passage 134. The two passages 131 and 134 are the input passages of the function element F1, and the two passages 132 and 133 are the input passages of the function element F2. An output passage 135 of the function element F1 is directly connected to one of the inputs of a function element F3. A passage 136 branching from the passage 135 is connected to the input of a pneumatic time delay device $T_1$ which may, for example, have the form of a fixed-capacity container in conjunction with a restriction. The output of the time delay device $T_1$ is connected to a second input of the function element F3 by a passage 137. The function element F3 is an AND element having two input passages 135 and 137, however, the input signal is inverted in the passage 137, so that in an output passage 138 of the function element a logical 1 in the form of a pressure signal may be produced only when there is a pressure in the input passage 135 but simultaneously there is no pressure in the input passage 137. The output signal of the function element F2 is applied to one of the inputs of a function element F4 by a passage 166 and also to an input passage of a function element F5 by a passage 139 branched from the latter passage. The output passage 138 of the function element F3 is also connected to an input of the function element F5. The function element F5 also is an AND element and its output is connected through a passage 140 to one of the inputs of a set-rest flip-flop element F7. The passage 140 is connected to the set input of the function element F7. The two output passage 141 and 142 of the flip-flop F7 are connected to valves V3 and V4 respectively. These valves are conventional pressure-controlled three-way valves to the control inputs of which the passages 141 and 142 are connected. Output passages 143 and 144 of the valves V3 and V4 respectively are connected to a cylinder 145 of a pneumatic engine 146. The engine has a piston 147 and a connecting rod 148. The passages 143 and 144 open one on either side of the piston 147, so that when the valve V3 is energized the piston will move downward, viewed in the Figure, and when the valve V4 is energized the piston will move in the opposite direction. At the end of the piston rod 148 there is provided a projection 149 capable of operating a pneumatic on-off switch in the form of an air slide valve V5. The air slide valve V5 is of a conventional type loaded by a spring 150 and may connect an output passage 151 either to a vent passage 152 or, when energized by the projection 149, to an air supply passage 153. The passage 151 is directly connected to a second input of the function element F4, which has an OR function. Through a branch 154 the passage 151 is connected to an adjustable restriction R and through a branch 155 to a check valve V6. The restriction R is connected through a passage 156 to a pneumatic capacitance C2. Through a passage 157 the check valve V6 is also connected to the capacitance C2. The latter is connected through a passage 158 to one of the inputs of a function element F6. The output passage 159 of the function element F4 is connected to a second input of the function element F6. This element, which has an OR function, has two inputs one of which is inverted, so that in its output passage 160 an output signal having the binary value 1 is produced only if at least either in the passage 158 there is a signal of the binary value 1 or in the passage 159 there is a signal of the binary value 0. The output passage 160 of the function element F6 is connected to the reset input of the flip-flop F7.

In FIG. 10 only the diagram part within the broken-line box 161 forms part of the logic circuit to be made up by the designer by means of function modules according to the invention. The components outside the box 161 form part of the conventional control means of the pneumatic engine 146.

The operation of the two-hand control shown diagrammatically in FIG. 10 is as follows: when the two pushbutton-operated valves V1 and V2 are simultaneously depressed by the machine operator, signals having the binary value 1 are simultaneously produced in the passages 131, 132, 133 and 134. Hence, signals having the binary value 1 will also be produced in the passages 135, 136, 138 and 139. Only after some time is a signal having the binary value 1 produced in the passage 137. This is due to the interposition of the time delay device T1 requiring a given time for building up sufficient pressure in this passage. This means that, at least temporarily, a signal having the binary value 1 is produced at the output of the function element F3 in the output passage 138. During this time the function element F5 receives signals having the binary value 1 at both inputs through the passages 138 and 139, so that a signal having the binary value 1 is also produced in the output passage 140. When the piston 147 of the engine 146 is in its upper position shown, the slide valve V5 is not operated by the projection 149 on the connecting rod 148 of the engine 146 and hence in the situation shown the passage 151 is connected to the vent 152 of the slide valve V5. This means that the function element F4 at one input, i.e., that which is connected to the passage 166, receives a signal having the binary value 1, but at its other input, i.e., that which is connected to the passage 151, receives a signal having the binary value 0, so that the binary value of the signal in the passage 159 connected to the output of the function element F4 will be 1. In the passage 158 there is a signal having the binary value 0, so that in the passage 160 connected to the output of the function element F6 a signal having the binary value 0 will also be present.

As a result, the flip-flop F7 at its set input connected to the passage 140 receives a signal having a binary value 1 and at its reset input connected to the passage 160 it receives a signal having the binary value 0. Consequently, a signal having the binary value 1 is produced in the passage 141, and a signal having the binary value 0 is produced in the passage 142, so that the valve V3 is energized, but the valve V4 not.

It may readily be seen that the function element F7 will immediately receive a reset signal through the passage 160 when at least one of the pushbutton-operated values V1 of V2 is no longer held depressed, for as soon as at least one valve is released the binary value of the signal in the passage 166 will become 0 and so will the signal in the passage 159. The signal in the passage 160 will therefore assume the value 1 and the flip-flop F7 will be caused to change state. It should be borne in mind that the signal in the passage 140 will have the binary value 1 for a short time only and during this time can switch the flip-flop F7 to its set condition. The signal in the passage 140 is a pulse signal. This is due to the fact that some time after the depression of the pushbutton a signal having the binary value 1 will be produced in the passage 137, so that the signal in the passage 138 and hence that in the passage 140 will assume the binary value 0. The connection through the time delay device $T_1$ has been chosen to ensure that the flip-flop F7 can only be set if both valves V1 and V2 are operated simultaneously or at least substantially simultaneously, for when the valve V1 alone is energized a pulse-shaped set signal will appear in the passage 140, it is true, but simultaneously a signal having the binary value 1 will also appear at the reset input. If then the valve V2 is energized, the signal in the passage 160 will assume the binary value 0 and hence there will no longer be a reset signal for the flip-flop F7, however, a pulse signal will not now appear in the passage 140, so that the flip-flop F7 will not be set. When the valve V2 is the first to be operated, a pulse-shaped set signal will be produced in the passage 140, but simultaneously there will be, just as in the preceding case, a reset signal having the binary value 1 in the passage 160. If subsequently the valve V1 is energized, the reset signal in the passage 160 will disappear, it is true, but in the passage 140 a pulse-shaped set signal will not now appear, so that in this case also flip-flop F7 cannot change condition.

Thus, it is impossible to start the engine 146 by depressing only one of the pushbuttons V1 or V2 or by operating them one after the other with an interval greater than the duration of the pulse-shaped set signal in the passage 140. The diagram, however, includes a take-over circuit which enables one or both of the pushbuttons V1 and V2 to be released after a safe situation of the machine has been produced, without interrupting the energization of the engine 146. Take-over occurs as soon as the projection 149 on the connecting rod 148 has switched the slide valve V5 so that the passage 151 is connected to the supply passage 153. The slide valve V5 is so located on the machine as to prevent it from being operated by the projection 149 before the instant at which the condition of the machine is to be regarded as safe. As soon as the passage 151 is connected to the supply pressure through the connection 153, a signal having the binary value 1 will be applied through the passage 151 to one input of the element F4, so that it is no longer necessary for the signal in the passage 166 to have the binary value 1. Hence, the signal in the passage 166 may now assume the binary value 0 without causing a change in the aforedescribed situation. From this instant the machine operator may release the pushbuttons of the valves V1 and/or V2. The pressure in the passage 151 is applied through the passage 154, the restriction R and the passage 156 to the capacitance C2 also and ultimately, through the passage 158, to the function element F6. The restriction R is adjustable, so that the signal in the passage 158 will assume the binary value 1 after an adjustable time. Hence, the engine 146 remains in its energized condition up to the instant at which, after the pre-adjusted time has elapsed, a signal having the binary value 1 is produced in the passage 158. Subsequently, a signal having a binary value 1 will also be produced in the passage 160, so that the flip-flop F7 is reset, which means that pressure is applied to the passage 142 and simultaneously the passage 141 is vented. The piston 147 of the engine 146 is moved upward and during its upward movement will release the slide valve V5, permitting this valve to be returned by the spring 150 to the position shown in FIG. 10. The capacitance C2 can now be vented through the check valve V6 and the passage 157, 155, 151 and 152, so that after some time the signal in the passage 158 assumes the binary value 0 again. Thus the circuit has returned to its initial situation, so that a new cycle may take place.

To implement a circuit unit, for example a unit according to the logical diagram within the box 161 of FIG. 10, by means of function modules according to the invention the designer will attempt as far as possible to combine function elements forming part of the circuit in a manner such that function elements are produced having inputs equal in number to those of a basic part. FIG. 11 again shows the part of the circuit diagram of FIG. 10 enclosed by the box 161, however, the function elements F3 and F5 are combined to form a single three input function element F3,5, and the function elements F4 and F6 are combined to form a single three input function element F4,6. Thus, a separate three input function module may be constructed for each of the function elements shown in FIG. 11. For this purpose, the designer need only determine the required circuit function of each function module and to look up the corresponding circuit functions in the drilling tables. For example, the circuit function of the function element F1 corresponds to the circuit function No. 1 in column II of the drilling table shown in FIG. 9. By processing a universal connecting plate as shown in FIGS. 5 to 7 according to the instructions given in columns IV and V of the table of FIG. 9 a function module having the same function as the function element F1 of FIG. 11 is simply obtained. Similarly by using other drilling tables, not shown in the drawings, function modules performing the same functions as the function elements F2, F3,5, F4,6 and F7 of FIG. 11 may be realized. Finally the entire circuit may be assembled by establishing the appropriate connections between the inputs and outputs of the various function modules.

The above example shows clearly how simply a given logic circuit may be realized by means of function modules according to the invention. The function modules used need not be of the type as shown in FIG. 4 and in cross-sectional view in FIG. 1 and designated by 122. For example, function modules may be used in which the basic part does not include three circuit elements of the type shown in FIG. 2 but comprises four or even more of these elements, and furthermore basic parts of an entirely different type, for example of the aforementioned DRELOBA type, may be used.

Also, it is not essential that the function connecting part should have the form of a universal connecting plate 124 or that it should comprise a single component. From the embodiment shown in FIGS. 5 to 7, for example, there may readily be derived an embodiment of a function connecting part comprising three separate component parts, i.e., a first rubber gasket containing the passage pattern of FIG. 5, a second rubber gasket containing the passage pattern of FIG. 7 and between these two gaskets a flat plate which may be provided with centering indentations 128. In such a tripartite embodiment the gasket 123 of FIG. 4 may be dispensed with.

What is claimed is:

1. A fluidic function module for constructing fluidic circuits for selectively performing logic, analog and combined operations, the function module comprising a basic part, the basic part comprising a plurality of separate fluidic circuit elements having input, output, air supply and vent passages; and a function connecting part provided with channels interconnecting the various input, output, air supply and vent passages of the individual circuit elements, an assembly of the basic part and connecting part forming a function module for selectively performing an AND, an OR, a universal and a storage function, the function connecting part being provided with a standard passage system having readily removable partitions between the channels and the passages of the standard passage system for adapting the connecting part to the selected function.

2. Fluidic function module as claimed in claim 1, wherein the function connecting part is provided with readily removable vent partitions communicating with the passages and the ambient atmosphere for selectively venting the passages to the ambient atmosphere.

3. Fluidic function module as claimed in claim 2, wherein each of the readily removable vent partitions is in direct communication with a passage of the standard passage system of the function connecting part, and wherein a passage of the basic part opens into the passage of the function connecting part.

4. Fluidic function module as claimed in claim 1, wherein the standard passage system in the function connecting part includes at least one passage having an internal cross-sectional area which is appreciably smaller than are those of the remainder of the passages of the standard passage system, the passage having a smaller internal cross-sectional area serving as a fluid restriction.

* * * * *